Dec. 2, 1947.  R. S. ELY  2,431,998
HEATING UTENSIL
Filed Dec. 22, 1945

INVENTOR.
Robert S. Ely
BY
Munn, Liddy & Glaccum
Attorneys

Patented Dec. 2, 1947

2,431,998

UNITED STATES PATENT OFFICE 2,431,998

HEATING UTENSIL

Robert S. Ely, New York, N. Y., assignor to Safeway Heat Elements, Inc., New York, N. Y.

Application December 22, 1945, Serial No. 637,010

2 Claims. (Cl. 219—44)

The present invention relates to cooking utensils which are provided with electric heating elements. It has been found very difficult to incorporate a heating element into the wall of a glass cooking utensil for the reason that the expansion coefficient of the heating element exceeds the expansion coefficient of the glass. When such cooking utensil is used, strains are set up in the glass by virtue of this expansion coefficient differential which, in the normal course of events, leads to destruction of the utensil.

The principal object of the present invention, therefore, is the provision of a cooking utensil, whether that utensil be made of glass or any other material, incorporating an electric heating element in such manner and by such means that the strains previously referred to are wholly eliminated. Essentially, this invention makes use of a yielding insulating material in which the heating element is disposed, the expansion of said heating element being neutralized and cancelled in its effect upon the utensil proper by the yielding nature of the insulating material in which the heating element is embedded.

Preferred embodiments of this invention are shown in the accompanying drawing in which—

Figure 1:
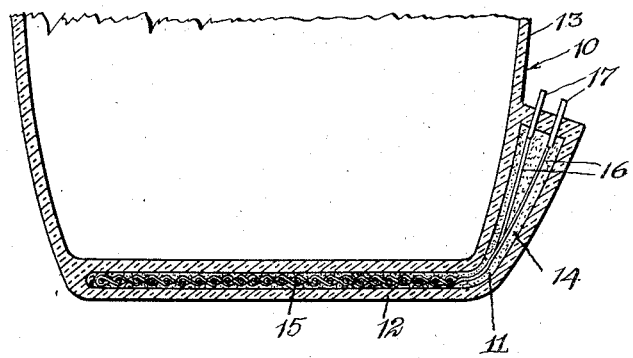
Fig. 1 is a vertical section through a glass cooking utensil in which an electric heating element is mounted in accordance with the present invention.
Figure 2:
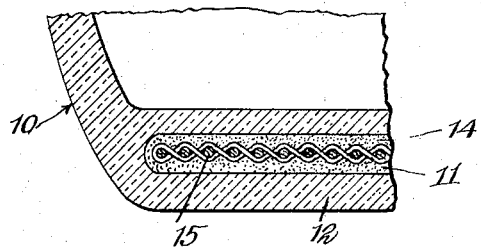
Fig. 2 is an enlarged fragmentary view of the device shown in Fig. 1.

Referring now to Figs. 1 and 2, it will be seen that the glass cooking utensil 10 is provided with a chamber 11 in its bottom wall or floor 12 and that said chamber extends upwardly to a limited extent along the side wall 13 of said utensil. Carried within said chamber 11 is a powdered insulating material 14 and embedded in said powdered material is an electric heating element 15. Electric conductors 16 connect said heating element to a pair of prongs 17 which extend outwardly from the top wall of said chamber 11. It is by means of these prongs 17 which are plugged into a conventional socket (not shown) at the end of an electric cord (also not shown) that said heating element may be connected to a suitable source of electric current. When the current is sent through said heating element, it expands in the usual manner but its expansion is taken up by the powdered insulating material 14 so that there is no transmission of the expansive forces thereby set up to the glass walls of the utensil 10.

A preferred type of heating element has been found to be a woven heating element and a preferred type of powdered insulating material has been found to be powdered magnesium oxide. These preferred forms are not intended to limit the invention but instead to illustrate it. Any suitable type of heating element may be used and any suitable type of powdered insulating material or glass wool, rock wool or similar insulating material, may also be used. It should be stated here that in using the powdered insulating material, care must be taken not to pack it into the chamber 11 too tightly. A loosely packed powder is required.

Figure 3:
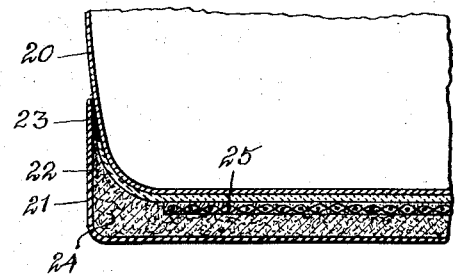
Fig. 3 is a view similar to that of Fig. 2 of a metal cooking utensil in which an electric heating element is mounted, also in accordance with the present invention.

Referring now to Fig. 3, it will be seen that the metal cooking utensil 20 is provided with a metal container 21 which is provided with a recess 22 in its top wall to accommodate the bottom of said cooking utensil 20. A container 21 is welded or otherwise affixed at 23 to the side wall of the cooking utensil 20. Within container 21 is loosely packed glass wool 24 or similar insulating material and embedded in said insulating material is a woven heating element 25. In all other respects the present embodiment of the invention is similar to the embodiment first above described. It will be understood that the tool 24 corresponds to the powder 14 of the first embodiment. Both types of insulation, when loosely packed, are enabled to neutralize and cancel out the expansive forces set up when the electric heating element is used.

It will be understood that what have above been described are but preferred embodiments of the present invention and that changes therein which may occur to men skilled in the art of making cooking utensils and heating elements therefor are herein contemplated.

I claim:

1. A cooking utensil comprising a glass vessel, a closed chamber formed in the bottom wall of said vessel and extending upwardly along one side thereof, a woven electric heating element in said chamber embedded in a loosely packed powdered dielectric substance, and means connecting said heating element with an outside source of electric current.

2. A cooking utensil comprising a glass vessel, a closed chamber formed in the bottom wall of said vessel and extending upwardly along one side thereof, relatively loosely packed magnesium oxide powder in said chamber, a woven heating element embedded in said powder, and electric conductors connecting said heating element to an outside source of electric current.

ROBERT S. ELY.

REFERENCES CITED

The following references are of record in the file of this patent:

UNITED STATES PATENTS

| Number | Name | Date |
|---|---|---|
| 2,194,193 | Barnes | Mar. 19, 1940 |
| 2,164,813 | Gunther | July 4, 1939 |
| 2,222,883 | Smith | Nov. 26, 1940 |
| 2,179,934 | Jones | Nov. 14, 1939 |
| 2,222,742 | Ducret et al. | Nov. 26, 1940 |
| 2,184,485 | Challet | Dec. 26, 1939 |